(12) United States Patent
Sun et al.

(10) Patent No.: US 8,909,046 B2
(45) Date of Patent: Dec. 9, 2014

(54) SWITCHING AND ROUTING PROTOCOL FOR A FIBER OPTIC TRANSMISSION SYSTEM

(71) Applicant: Titan Photonics, Inc., Fremont, CA (US)

(72) Inventors: Chen-Kuo Sun, Escondido, CA (US); Peter H. Wolff, Apollo Beach, FL (US)

(73) Assignee: Titan Photonics, Fremont, CA (US)

( * ) Notice: Subject to any disclaimer, the term of this patent is extended or adjusted under 35 U.S.C. 154(b) by 209 days.

(21) Appl. No.: 13/645,292

(22) Filed: Oct. 4, 2012

(65) Prior Publication Data

US 2014/0050478 A1 Feb. 20, 2014

Related U.S. Application Data

(63) Continuation-in-part of application No. 13/585,653, filed on Aug. 14, 2012.

(51) Int. Cl.
*H04B 10/2575* (2013.01)
*H04J 14/02* (2006.01)

(52) U.S. Cl.
CPC ........ *H04B 10/2575* (2013.01); *H04J 14/0298* (2013.01)
USPC ............. 398/66; 398/115; 398/116; 398/198; 398/75; 398/76

(58) Field of Classification Search
CPC ............................ H04B 10/27; H04Q 11/0067
USPC ......................... 398/115, 116, 198, 66, 75, 76
See application file for complete search history.

(56) References Cited

U.S. PATENT DOCUMENTS

| 3,488,586 | A | 1/1970 | Watrous et al. |
| 4,812,641 | A | 3/1989 | Ortiz Jr. |
| 6,353,490 | B1 | 3/2002 | Singer et al. |
| 6,418,558 | B1 * | 7/2002 | Roberts et al. ................ 725/129 |
| 6,493,485 | B1 | 12/2002 | Korevaar |
| 6,538,789 | B2 | 3/2003 | Sun |
| 7,146,103 | B2 * | 12/2006 | Yee et al. ......................... 398/68 |
| 2002/0012493 | A1 * | 1/2002 | Newell et al. ................... 385/24 |
| 2006/0165413 | A1 * | 7/2006 | Schemmann et al. .......... 398/71 |
| 2007/0150927 | A1 | 6/2007 | Chapman |
| 2012/0230692 | A1 | 9/2012 | Sun |

* cited by examiner

*Primary Examiner* — David Payne
*Assistant Examiner* — Omar S Ismail
(74) *Attorney, Agent, or Firm* — Nydegger & Associates (57) ABSTRACT

A system for transporting a plurality of analog and/or digital signals over an optical fiber can include one or more master modems for modulating digital signals and/or RF inserters modulating video signals. The RF signals from the modem(s)/RF inserters are up-converted resulting in frequency bands that are non-overlapping and are spaced apart within a single sub-octave. The sub-octave signal is then converted into an optical signal and directed onto an end of an optical fiber. At the downstream end of the optical fiber, the received optical signal is converted to an RF signal at an optical receiver. The RF signal is then filtered, down-converted and directed to a selected coaxial distribution unit. From the coaxial distribution unit, the RF signal is demodulated, e.g. at a slave modem, to recover the initial analog and/or digital signal.

21 Claims, 5 Drawing Sheets

SWITCHING AND ROUTING PROTOCOL FOR A FIBER OPTIC TRANSMISSION SYSTEM

This application is a continuation-in-part of application Ser. No. 13/585,653, filed Aug. 14, 2012, which is currently pending. The contents of application Ser. No. 13/585,653 are incorporated herein by reference.

FIELD OF THE INVENTION

The present invention pertains generally to optical systems and methods for transporting digital and/or analog signals. More particularly, the present invention pertains to systems and methods for simultaneously transporting a plurality of different analog and/or digital signals, in a sub-octave transmission, over a relatively long optical fiber. The present invention is particularly, but not exclusively, useful for systems and methods that combine a plurality of different digital and/or analog signals onto a single sub-octave radio-frequency (RF) signal for subsequent conversion to a light beam configured for optical transmission over an optical fiber.

BACKGROUND OF THE INVENTION

With regard to a communications system, a point-to-point connection is a connection in which information is transported between two nodes or endpoints. On the other hand, a point-to-multipoint connection is a connection between a point node and a central node where the central node is also connected to one or more peripheral nodes.

Modernly, there is a need to transport signals including video, voice and data information over relatively long distances using point-to-point and point-to-multipoint connections. In this regard, optical fibers can be used to transport signals over relatively long distances with relatively low signal distortion or attenuation, as compared with copper wire or co-axial cables.

One way to transport digital information across an optical fiber is to encode the digital signal on an analog signal (e.g. RF signal) using a modem. Next, the RF signal can be converted into a light beam signal using an optical transmitter such as a laser diode, and then introduced into an end of an optical fiber. In this process, more than one light signal can be transmitted at one time. Typically, to accommodate the transport of a large volume of information, a relatively large bandwidth RF signal, having a multi-octave bandwidth, is converted and transmitted over the optical fiber. For these multi-octave optical transmissions, composite second order distortions caused by fiber dispersion can cause significant signal degradation at optical transport distances of about 1 km, or more.

One solution to the limitations associated with composite second order distortions is to use an RF signal having a sub-octave bandwidth. For example, U.S. patent application Ser. No. 12/980,008 for an invention titled "Passive Optical Network with Sub-Octave Transmission," which is owned by the same assignee as the present invention, and which is incorporated herein by reference, discloses that the unwanted second order distortions in a transmitted optical signal can be significantly reduced in a passive optical network when the radio frequency carriers are selected from a sub-octave bandwidth. Further, with a frequency up-conversion for the transmission of signals in a sub-octave band, frequency interferences in multi-wavelength optical transmissions can be avoided.

In light of the above, it is an object of the present invention to provide a system and method for optically transporting a plurality of signals over a single optical fiber over distances greater than about 1 km. Another object of the present invention is to provide a system and method for reducing the adverse effects of composite second order distortions during optical transport of digital signals and analog signals, including video signals, over a point-to-point or point-to-multipoint communications connection. It is another object of the present invention to control the volume of signal transmissions between an upstream device and a downstream device in either a point-to-point network or in a point-to-multipoint network to prevent a collision of signals at a network point which might otherwise cause an overload in the system. Still another object of the present invention is to provide a switching and routing protocol for a fiber optic transmission system that is easy to use, relatively easy to manufacture, and comparatively cost effective.

SUMMARY OF THE INVENTION

In accordance with the present invention, a system for transporting a plurality of digital and/or analog signals (i.e. "n" signals) over an optical fiber can include one or more modems for modulating one or more digital signals on a respective RF carrier signal. In addition, the system can include one or more RF inserters that receive signals, such as analog or digital video signals, and output a corresponding RF signal. For example, the RF inserter can perform a modulation function in generating the RF signal such as quadrature amplitude modulation (CLAM) or quadrature phase shift keying (QPSK).

This results in "n" RF signals, and, typically each RF signal has a substantially same initial carrier frequency band ($F_O$). The system also includes a plurality of up-convertors, with one up-convertor for each of the RF signals.

Functionally, each up-convertor operates on a respective RF signal to output an RF signal having a frequency band including a frequency that is greater than ($F_O$). For example, the first up-convertor operates on a first RF signal to output a frequency band that includes the frequency ($F_1$), the second up-convertor operates on a second RF signal to output a frequency band that includes the frequency ($F_2$), and so on, with the $n^{th}$ up-convertor operating on an $n^{th}$ RF signal to output a frequency band that includes the frequency ($F_n$). Furthermore, for the present invention, each frequency band can include both sidebands (i.e. double sideband (DSB)), or only a single sideband (SSB) of the modulated signal. For example, the single sideband signal may be produced using a suitable filter or a single sideband (SSB) mixer.

For the system, the "n" frequency bands output by the "n" up-convertors (and filters in some cases) are non-overlapping and are spaced apart within a single sub-octave. Thus, all of the frequencies output by the up-convertors reside within a frequency spectrum between $f_L$ and $f_H$, where $2f_L-f_H>0$. The frequency bands output by the up-convertors are then combined using an RF combiner and the combined signal is directed to an optical transmitter. At the optical transmitter, the combined RF signal is converted into an optical signal, for example, having a wavelength, ($\lambda_1$), that is directed onto an end of an optical fiber.

In more structural detail, each up-convertor includes a local oscillator and a mixer. To produce the spaced apart frequency bands described above, the local oscillator of each up-convertor outputs a unique frequency, $F_{LO,1}$, $F_{LO,2}$ ... $F_{LO,n}$. For example, the mixer of the first up-convertor mixes the first RF signal with $F_{LO,1}$ to output a frequency band including ($F_1$), the mixer of the second up-convertor mixes the second RF signal with $F_{LO,2}$ to output a frequency band including $(F_2)$, and so on.

For the present invention, the system further includes an optical receiver to convert the optical signal to an RF signal after the optical signal has travelled through the optical fiber. From the optical receiver, the RF signal is directed to an RF splitter which splits the RF signal into signal fractions and directs each signal fraction onto a respective circuit path. Each circuit path, in turn, includes a passband filter and a down-convertor. The passband filter removes frequencies outside of the sub-octave to reduce, and in some cases, eliminate second order distortions generated by the optical transmitter and introduced during transmission of the optical signal along the optical fiber. Furthermore, the passband filter can be used to pass only the desired frequency for subsequent down conversion.

Functionally, each down-convertor operates on a respective RF signal fraction from the splitter and outputs an RF signal having one of the transmitted digital/analog signals encoded thereon. Typically, all of the RF signals output by the down-convertors have a common frequency, such as $(F_0)$. For example, the first down-convertor operates on a first RF signal fraction to output an RF signal at frequency $(F_0)$ that is modulated with the first digital signal, the second down-convertor operates on a second RF signal fraction to output an RF signal at frequency $(F_0)$ that is modulated with the second digital signal, and so on. Each of the RF signals from the down-convertors can then be sent to a respective modem to demodulate the analog RF signals and output the transmitted digital or analog signals. The recovered digital/analog signals can then be transmitted over one or more networks to their respective destination address.

In an alternate embodiment, each down-convertor can include a circuit such as a tuning circuit and a local oscillator to recover one of the frequency bands that are modulated with one of the initial digital signals. For example, the first down-corrector recovers the first frequency band that is modulated with the first digital signal, the second down-convertor recovers the second frequency band that is modulated with the second digital signal etc. For this recovery, each down-convertor requires frequency and phase information regarding the local oscillator, $LO_1, LO_2 \ldots LO_n$ used to up-convert the initial RF signal on the transmit side of the optical fiber. Specifically, each down-convertor requires this information to drive its local oscillator. For example, the first down-convertor requires information regarding the corresponding up-convertor local oscillator, $LO_1$, to drive its local oscillator, $LO_1'$ during recovery of the first RF signal encoding the first digital signal.

For the above-described purposes, a reference local oscillator, $LO_{REF}$, producing a reference frequency, $F_{LO-REF}$, can be connected to each of the local oscillators $LO_{1\ldots n}$, and used to generate the local oscillator signals in the up-convertors. With these connections, relative information between the reference local oscillator and the up-convertor local oscillators, including frequency and phase information, can be transmitted through the fiber. As envisioned for the present invention the output from the reference local oscillator can be sent with a telemetry signal that provides additional system information for operational use as needed. On the receive side, the reference local oscillator signal and telemetry signals can then be used to generate the local oscillator signals of the down-convertors during signal recovery.

Although the description above, for purposes of clarity, has described the transmission of digital signals in a first direction (i.e. forward direction) along an optical fiber, it is to be appreciated that the structures described herein may be provided on each side of the optical fiber to provide simultaneous digital/analog signal transmission in the same fiber in both forward and reverse directions. For example, an optical signal having a wavelength, $(\lambda_1)$ may be transmitted in a forward direction while an optical signal having a wavelength, $(\lambda_2)$ is simultaneously transmitted in a reverse direction. It is also well known in the art that both forward and reverse transmissions (e.g. $\lambda_1$ and $\lambda_2$) can use multiple wavelengths, which can be combined to increase the total transmission capacity in each direction.

In accordance with a preferred embodiment of the present invention, a system is provided with a capability for increasing the flow of message traffic through a fiber optic cable. For this system, the volume of signal transmissions between an upstream device and a downstream device can be time controlled and/or frequency controlled. Moreover, as envisioned for the present invention, the system can be used in either a point-to-point network or in a point-to-multipoint network.

Time control for the present invention is accomplished by incorporating a Time Division Multiplexing (TDM) capability with a modem at the upstream end of the fiber optic. Specifically, the TDM capability is provided to establish a stacking protocol for data transmissions that will prevent a collision of signals from one or more downstream devices at the upstream end of the fiber optic which might otherwise cause an overload in the system. Further, frequency control for the present invention is accomplished by incorporating a Frequency Division Multiplexing (FDM) capability. This is also accomplished with the modems and/or RF inserters at the upstream end of the fiber optic.

More specifically, the FDM capability is provided to accommodate the data transmission capability of the upstream modem or RF inserter itself, and to enable signal transmissions to different downstream devices on different frequencies.

Structurally, the system includes at least one, but typically a plurality, of so-called "master modem(s)." Each master modem is located at the upstream end of the fiber optic and it is connected into the system for communication with predetermined downstream components. In this combination, the FDM scheme establishes different signal frequencies for respective signals to maintain signal integrity. Also, different frequencies can be used in the FDM scheme for the purpose of routing signals to specifically intended destination addresses. Each master modem then uses its TDM capability to queue the data signals into a TDM protocol for subsequent transmission over the fiber optic.

In accordance with the TDM protocol, each master modem establishes its own sequence for message transmissions. Further, as part of the TDM protocol, the master modem will also impose specific time-of-transmission requirements for messages that are in its queue. As set forth below, the specific configuration of the TDM protocol and its time-of-transmission requirements in particular, will depend on the traffic capacity of the downstream components that are connected with the master modem.

Downstream components in a system of the present invention are a coaxial distribution unit and a so-called "slave modem." Both of these components are specifically connected through the fiber optic cable with a particular master modem. Thus, for a downstream transmission, depending on the destination address of a data signal at the downstream end of the fiber optic, signals are routed first to a particular master modem and then to a predetermined coaxial distribution unit. From the coaxial distribution unit the signals are sent to a predetermined "slave modem." At the slave modem, the frequency of each signal is adjusted to comply with any requirements imposed by the master modem in the FDM scheme, such as identification of a destination address. Each signal is then further transmitted from the "slave modem" to the particular downstream device at the destination address.

In an operation of the present invention, data (i.e. a digital message) is routed from an upstream device to a master modem at the upstream end of the fiber optic. Additionally, signals, such as video signals, are received from an upstream device by an RF inserter at the upstream end of the fiber optic. Specifically, the particular master modem that is to be used will be selected according to the destination address of the data. Recall, each master modem is connected with specific downstream components.

Upon the receipt of data/video, the master modem/RF inserter assigns frequencies according to an FEW scheme and, in some cases, establishes a TDM protocol. In particular, the FM scheme is employed to avoid data congestion from incoming signals at the master modem/RF inserter, and to direct signals to the intended destination address. Further, the TDM protocol is configured to accommodate the present traffic volume demands on the system. As indicated above, the TDM protocol accommodates the coaxial distribution unit and the "slave modem" that serve the downstream device at the destination address. As envisioned for the present invention, the configuration of the TDM protocol will include imposing specific time-of-transmission requirements for the data. In the event, once a TDM protocol has been configured, the data is then sent over the fiber optic cable in compliance with the TDM protocol. More specifically, the outputs from each master modem and RF inserter can be up-converted and combined with other modem outputs to generate a combined sub-octave signal (as described above). The combined sub-octave signal is then directed to an optical transmitter which converts the combined sub-octave signal into an optical signal and directs the optical signal onto an end of an optical fiber.

At the downstream end of the fiber optic cable, the received optical signal is converted to an RF signal at an optical receiver. The RF signal is then split, filtered and down-converted (as described above) and then routed to a selected coaxial distribution unit. As indicated above, the selection of the particular coaxial distribution unit that will receive the data is determined based on the destination address of the signal (data). The coaxial distribution unit then routes the signal (data or video) to the "slave modem" for further transmission to the downstream device at the destination address.

Upstream transmissions from the downstream device to an upstream device will use essentially the same routing that is described above for downstream transmissions. This is so regardless whether the upstream transmission is a reply or is a new message. In either case, however, before there can be an upstream transmission the slave modem must first receive permission from the master modem to make the transmission. This requires the slave modem to send a request signal to the master modem for instructions regarding compliance with an FDM scheme, and for a position in its TDM protocol. When the TDM protocol has been configured according to time availability and the transmission delay to accommodate the upstream transmission, and compliance with the FDM scheme has been established, the slave modem is notified by the master modem that an upstream transmission can be sent. The downstream device can then transmit upstream to the upstream device.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
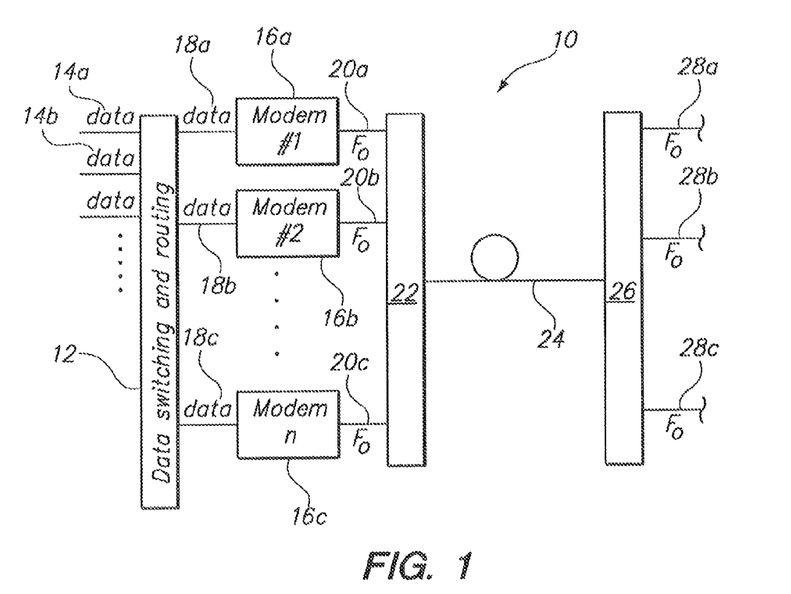
FIG. 1 is a schematic drawing showing a general overview of a transmission system in accordance with the present invention.

Referring initially to FIG. 1, a system for transporting digital signals is shown and is generally designated 10. As shown, the system 10 includes a data switching and routing unit 12 operationally connected to receive a plurality of digital data streams (of which data streams 14a and 14b are labeled) and route the received data streams 14a,b based on address information in the data stream 14a,b to an appropriate modem 16a-c. For the system 10, the data streams 14a,b can include, for example, packets having a header with source and destination information, audio and video signals or computer signals such as computer files or instructions and/or digital signals from other nodes in a communication network.

Continuing with FIG. 1, as shown, each modem 16a-c receives and operates on a respective routed data stream 18a-c and outputs a respective RF signal 20a-c having a carrier that is modulated by one of the routed data streams 18a-c. Typically, each RF signal that is output by a modem 16a-c has a frequency in the range of about 10 MHz to 1 GHz. For the system 10, the carrier frequencies of each modem 16a-c may differ, or, as shown, the carrier frequency, ($F_0$), of each modem 16a-c may be the same.

From the modems 16a-c, the RF signals 20a-c are processed and converted by a transmitter 22 which outputs an optical signal onto optical fiber 24. The structural and operational details of the transmitter 22 are described in more detail below with reference to FIG. 2. Continuing with FIG. 1, it can be seen that a receiver 26 processes and converts the optical signal from the optical fiber 24 and outputs a plurality of RF signals 28a-c. The structural and operational details of the receiver 26 are described in more detail below with reference to FIG. 2. Typically, each RF signal 28a-c output by the receiver 26 has a frequency in the range of about 10 MHz to 1 GHz. For the system 10, the carrier frequencies of the RF signals 28a-c may differ, or, as shown, the carrier frequency, ($F_0$), of each RF signal 28a-c may be the same.

For the system 10 shown in FIG. 1, the RF signals 28a-c may be selectively routed to one or more networks. For example, these networks can include a Passive Optical Network (PON), an Ethernet over Coaxial (EOC) network, and a Point-to-Point (P2P) network. Details including a schematic diagram of these types of networks are provided in U.S. patent application Ser. No. 13/045,250, titled "Sub-Octave RF Stacking for Optical Transport and De-Stacking for Distribution" filed Mar. 10, 2011, the entire contents of which are hereby incorporated by reference.

Figure 2:
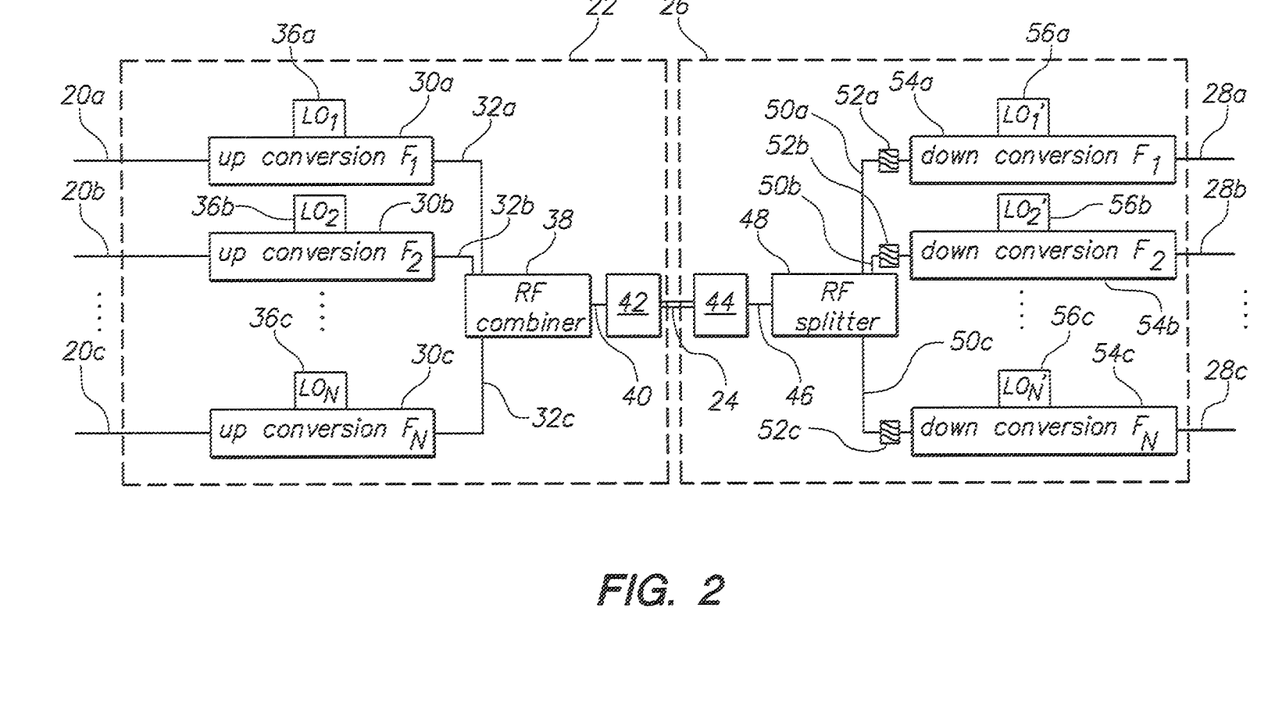
FIG. 2 is a schematic drawing showing the transmitter and receiver of FIG. 1 in greater detail for use with single sideband signals.

The details and operation of the transmitter 22 and receiver 26 can best be appreciated with reference to FIG. 2. As seen there, the transmitter 22 includes a plurality of up-convertors 30a-c, with each up-convertor 30a-c operating on a respective RF signal 20a-c to output an RF signal 32a-c having a frequency band that includes a frequency that is greater than the incoming RF signal 20a-c, e.g. ($F_0$). More specifically, as shown by cross referencing FIGS. 2 and 3, the first up-convertor 30a operates on a first RF signal 20a to output a frequency band that includes the frequency ($F_1$), the second up-convertor 30b operates on a second RF signal 20b to output a frequency band that includes the frequency ($F_2$), and so on, with the $n^{th}$ up-convertor 30c operating on an $n^{th}$ RF signal 20c to output a frequency band that includes the frequency ($F_n$).

As detailed further below, for the embodiment of the present invention shown in FIG. 2, each frequency band output by a respective up-convertor 30a-c is preferably a single sideband signal. In detail, the single sideband signal (either high side or low side) may be produced using a suitable filter or any other suitable method known in the pertinent art for producing a single sideband signal.

Figure 3:
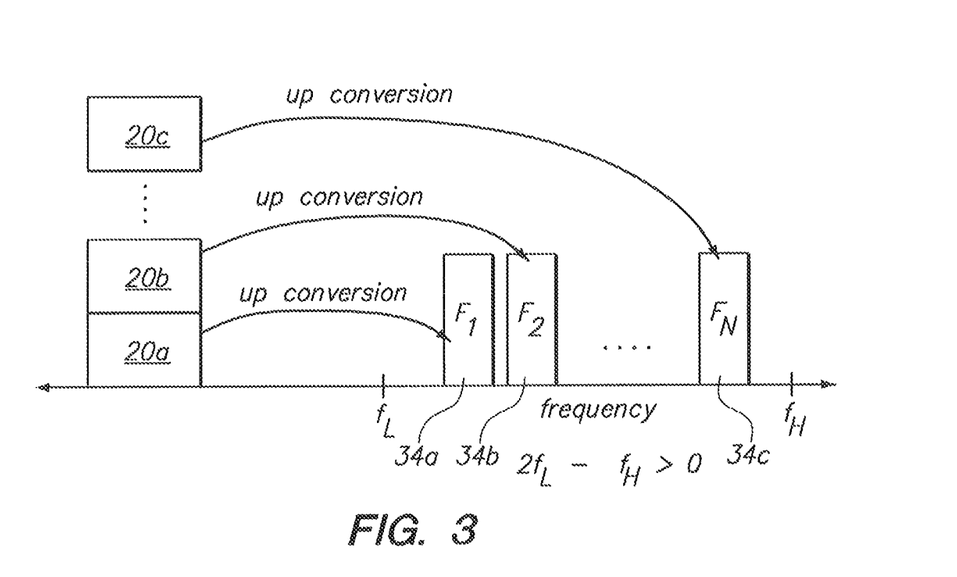
FIG. 3 is a frequency plot illustrating the up conversion of a plurality of signals into frequency bands that are non-overlapping with each other and are spaced apart from each other within a single sub-octave.

Cross referencing FIGS. 2 and 3, it can be seen that the RF signals 20a-c are up-converted by the up-convertors 30a-c to respective frequency bands 34a-c that are non-overlapping and are spaced apart within a single sub-octave. Thus, all of the frequencies output by the up-convertors 30a-c reside within a frequency spectrum between $f_L$ and $f_H$, where $2f_L - f_H > 0$. For example, frequency bands may begin at a frequency of about 1,000 MHz, have a bandwidth of about 100 MHz and a spacing between bands of 4 MHz. In some instances, frequencies in the range of about 3 GHz, and above, may be used. In some cases, fiber optic transmission on a sub-octave bandwidth can reduce second order distortions by as much as 80%, or more.

To accomplish the above-described up-conversion, as shown in FIG. 2, each up-convertor 30a-c includes a local oscillator 36a-c and a mixer to mix the output of the local oscillator 36a-c with the incoming RE signal 20a-c. For the transmitter 22, each local oscillator 36a-c outputs a unique frequency and, as a consequence, each up-convertor 30a-c outputs a unique frequency band 34a-c that does not overlap with the other frequency bands 34a-c and is spaced apart from the other frequency bands 34a-c within a single sub-octave as shown in FIG. 3.

As best seen in FIG. 2, the RE signals 32a-c having respective frequency bands 34a-c (see FIG. 3) that are output from the up-convertors 30a-c are input to an RF combiner 38 which combines the RE signals 32a-c into a combined signal 40 that is output onto a common conductor that is connected to an optical transmitter 42. At the optical transmitter 42, the combined signal 40 is converted into an optical signal, for example, having a wavelength ($\lambda_1$) that is directed onto an end of the optical fiber 24. For example, the optical transmitter 42 may include a laser diode and the optical fiber 24 may have a length greater than about 1 km.

Continuing with FIG. 2, it can be seen that the receiver 26 includes an optical receiver 44 operationally connected to the optical fiber 24 to receive optical signals sent by the optical transmitter 42. For example, the optical receiver 44 may include a photodiode. As further shown in FIG. 2, the optical receiver 44 converts the optical signal from the optical fiber 24 to an RF signal 46 which is then directed to an RF splitter 48. At the RF splitter 48, the RF signal 46 is split into signal fractions 50a-c which are placed on respective circuit paths which include a respective passband filter 52a-c and a respective down-convertor 54a-c. For the system, the passband filters 52a-c remove frequencies outside of the sub-octave (i.e. frequency spectrum between $f_L$ and $f_H$) to reduce and, in same cases, eliminate second order distortions generated during transmission of the optical signal along the optical fiber 24. In some cases, a tuning circuit in the down-convertor 54a-c may function to filter some or all of the out-of-band frequencies (i.e. frequencies outside the sub-octave).

Continuing with reference to FIG. 2, each down-convertor 54a-c operates on a respective RF signal fraction 50a-c from the RF splitter 48 and outputs an RF signal 28a-c having one of the transmitted digital signals encoded thereon. Typically, all of the RF signals 28a-c output by the down-convertors have a common frequency, such as ($F_0$). For example, the first down-convertor 54a operates on a first RF signal fraction 50a to output an RF signal 28a at frequency ($F_0$) that is modulated with the first digital signal, the second down-convertor 54b operates on a second RF signal fraction 50b to output an RF signal 28b at frequency ($F_0$) that is modulated with the second digital signal, and the $n^{th}$ down-convertor 54c operates on the $n^{th}$ RF signal fraction 50c to output an RF signal 28c at frequency ($F_0$) that is modulated with the $n^{th}$ digital signal. For the receiver 26, each down-convertor 54a-c can include a circuit such as a tuning circuit that is tuned to select one of the frequency bands 34a-c (see FIG. 3) and a local oscillator 56a-c producing a local oscillator output that is mixed with the selected frequency bands 34a-c. The output of each down-convertor 54a-c is an RF signal 28a-c that is modulated with one of the initial digital signals. Each of the RF signals 28a-c from the down-convertors 54a-c can then be sent to a respective modem (not shown) to demodulate the analog RF signals and output the transmitted digital signals. The recovered digital signals can then be transmitted over one or more networks to their respective destination address.

Figure 4:
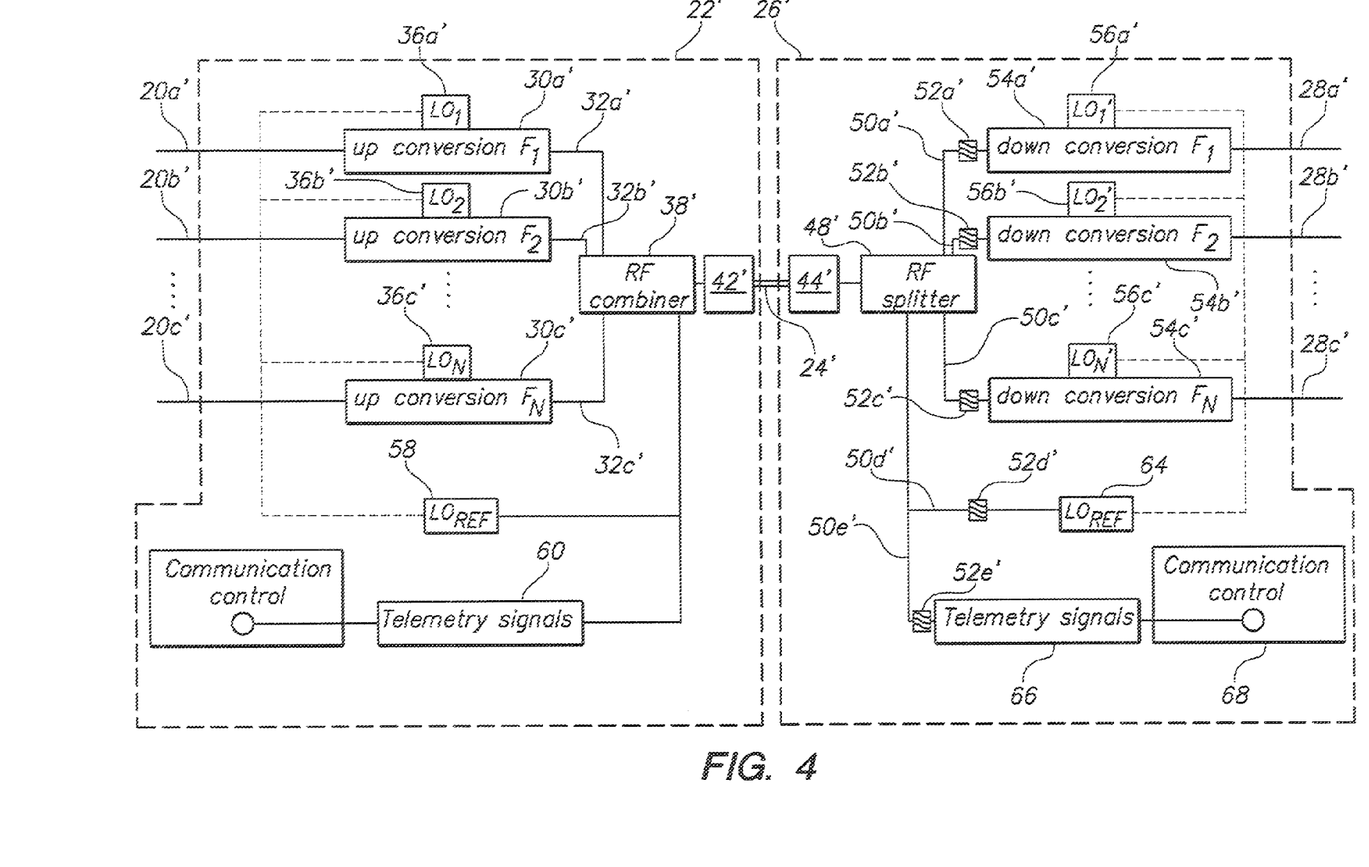
FIG. 4 is a schematic drawing showing another embodiment of a transmitter and receiver for use in the system of FIG. 1 for use with single sideband or double sideband.

FIG. 4 shows another embodiment having a transmitter 22' that includes a plurality of up-convertors 30a'-c', with each up-convertor 30a'-c' operating on a respective RF signal 20a'-c' to output an RF signal 32a'-c' having a frequency band that includes a frequency that is greater than the incoming RF signal 20a'-c', e.g. ($F_0$). For this embodiment, each frequency band output by a respective up-convertor 30a'-c' can include both sidebands (i.e. double sideband (DSB)), can include a vestigial sideband (VSB) signal or may include only a single sideband (SSB) of the modulated signal. As described above for the embodiment shown in FIG. 2, for this embodiment, the RF signals 20a'-c' are up-converted by the up-convertors 30a'-c' to respective frequency bands 34a-c (See FIG. 3) that are non-overlapping and are spaced apart within a single sub-octave. For this purpose, each up-convertor 30a'-c' includes a local oscillator 36a'-c' and a mixer. Also shown, a reference local oscillator 58, producing a reference frequency, $F_{LO-REF}$, is connected to each of the local oscillators 36a'-c', and used to generate the local oscillator signals in the up-convertors 30a'-c'. A respective mixer then mixes the output of a local oscillator 36a'-c' with a respective incoming RF signal 20a'-c' to produce the up-convertor 30a'-c' output.

With the connections between the local oscillator 36a'-c' and reference local oscillator 58, relative information between the reference local oscillator 58 and the up-convertor local oscillators 36a'-c', including frequency and/or phase information, can be controlled by reference local oscillator 58 using phase lock loop circuits, which reside in local oscillators 36a'-c'. Output from the reference local oscillator 68 and the telemetry signal 60 can be combined at the RF combiner 38' with the frequency bands from the up-convertors 30a'-c' and transmitted via optical transmitter 42' through the optical fiber 24'.

Continuing with FIG. 4, it can be seen that the receiver 26' includes an optical receiver 44' operationally connected to the optical fiber 24' to receive optical signals sent by the optical transmitter 42', convert the optical signal to an RF signal and direct the RF signal to an RF splitter 48'. At the RF splitter 48', the RF signal is split into signal fractions 50a'-e'. As shown, signal fractions 50a'-c' are placed on respective circuit paths which include a respective passband filter 52a'-c' and a respective down-convertor 54a'-c'. For the system, the passband filters 52a'-e' remove frequencies outside of the sub-octave (i.e. frequency spectrum between $f_L$ and $f_H$) to reduce, and in some cases, eliminate second order distortions generated by the optical transmitter 42' and introduced during transmission of the optical signal along the optical fiber 24', in some cases, tuning circuits in the down-convertors 54a'-c' may Function to filter some or all of the out-of-band frequencies (i.e. frequencies outside the sub-octave).

As further shown in FIG. 4, signal fraction 50d' is placed on a respective circuit path which includes a respective passband filter 52d' and a reference local oscillator recovery unit 64 which recovers the reference local oscillator signal. For example, the reference local oscillator recovery unit 64 can include phase lack loop circuitry components such as phase detectors and Voltage Control Oscillators (VCO). Also shown, signal fraction 50e' is placed on a respective circuit path which includes a respective passband filter 52e' and a telemetry signal recovery unit 66 which recovers the telemetry signal. As shown, the reference local oscillator recovery unit 64 and telemetry signal recovery unit 66 are connected to a communication control unit 68 and the local oscillator 56a'-c' of each down-convertor 54a'-c'. With this arrangement, an appropriate local oscillator 56a'-c' signal can be generated using the recovered reference local oscillator signal (i.e. relative phase and/or frequency between the reference local oscillator signal and the corresponding up-convertor local oscillator). With the appropriate signal from the local oscillator 56a'-c', each respective down-convertor 54a'-c' operates on a respective RF signal fraction 50a'-c' from the RF splitter 48' and outputs an RF signal 28a'-c' having one of the transmitted digital signals encoded thereon.

Figure 5:
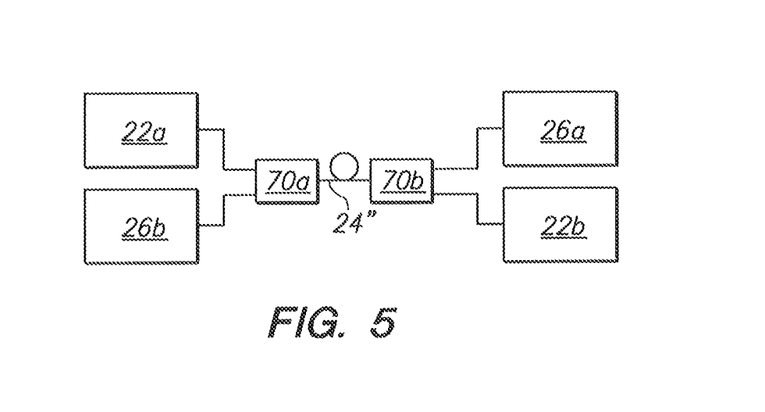
FIG. 5 is a schematic drawing illustrating that the systems and methods of the present invention can be used to simultaneous transport digital signals in the same fiber in both forward and reverse directions.

FIG. 5 shows that the structures described herein may be provided on each side of an optical fiber 24" to provide simultaneous digital signal transmission in the same optical fiber 24" in both forward and reverse directions. As shown, a transmitter 22a (as described above with reference to transmitter 22 or 22') can be positioned to transmit an optical signal having a wavelength, ($\lambda_1$) in a forward direction through, in series, wavelength division multiplexer 70a, optical fiber 24" and wavelength division multiplexer 70b for receipt by receiver 26a (as described above with reference to receiver 26 or 26'). Also, as shown, a transmitter 22b (as described above with reference to transmitter 22 or 22') can be positioned to transmit an optical signal having a wavelength, ($\lambda_2$) in a reverse direction through, in series, wavelength division multiplexer 70b, fiber 24" and wavelength division multiplexer 70a for receipt by receiver 26b (as described above with reference to receiver 26 or 26'). It is to be appreciated that some of the components of transmitter 22a may be shared, integrated with or co-located with some of the components of receiver 26b. It is also to be appreciated that more wavelengths can be inserted in the forward direction and/or in the reverse direction to increase the total digital transmission capacity.

As described above, the systems described herein can be used to transport frequency bands across an optical fiber that may include both sidebands (i.e. double sideband (DSB)), can include a vestigial sideband (VSB) signal or may include only a single sideband (SSB) of the modulated signal. In some instances, it may be more desirable to use single sideband signals because they use less transmission bandwidth than DSB, eliminate image issues (see below) and potentially reduce clipping effects. In addition, variations in the Local Oscillator (i.e. carrier frequency) during a transmission have only a minimal adverse effect when single sideband signals are used. On the other hand, when double sideband signals are used, a problem may result in which there is a folding back of images, which occurs for a DSB signal in its recovery during a down-conversion. This can cause cancellation (i.e. introduce distortions) unless both frequency and phase are accurately recovered in the DSB signal. The embodiment shown in FIG. 4 provides a solution by establishing a local oscillator reference, $LO_{REF}$, that can be used to generate the local oscillator signals, $LO_N$ at the transmit end of the system. Both $LO_{REF}$ and $LO_N$ are then transmitted over the fiber optic to the receive end of the system where the $LO_{REF}$ is used to recover $LO_N'$ for down-conversion. The use of the $LO_{REF}$ approach can also be used to improve signal recovery when single sideband signals are used.

Figure 6:
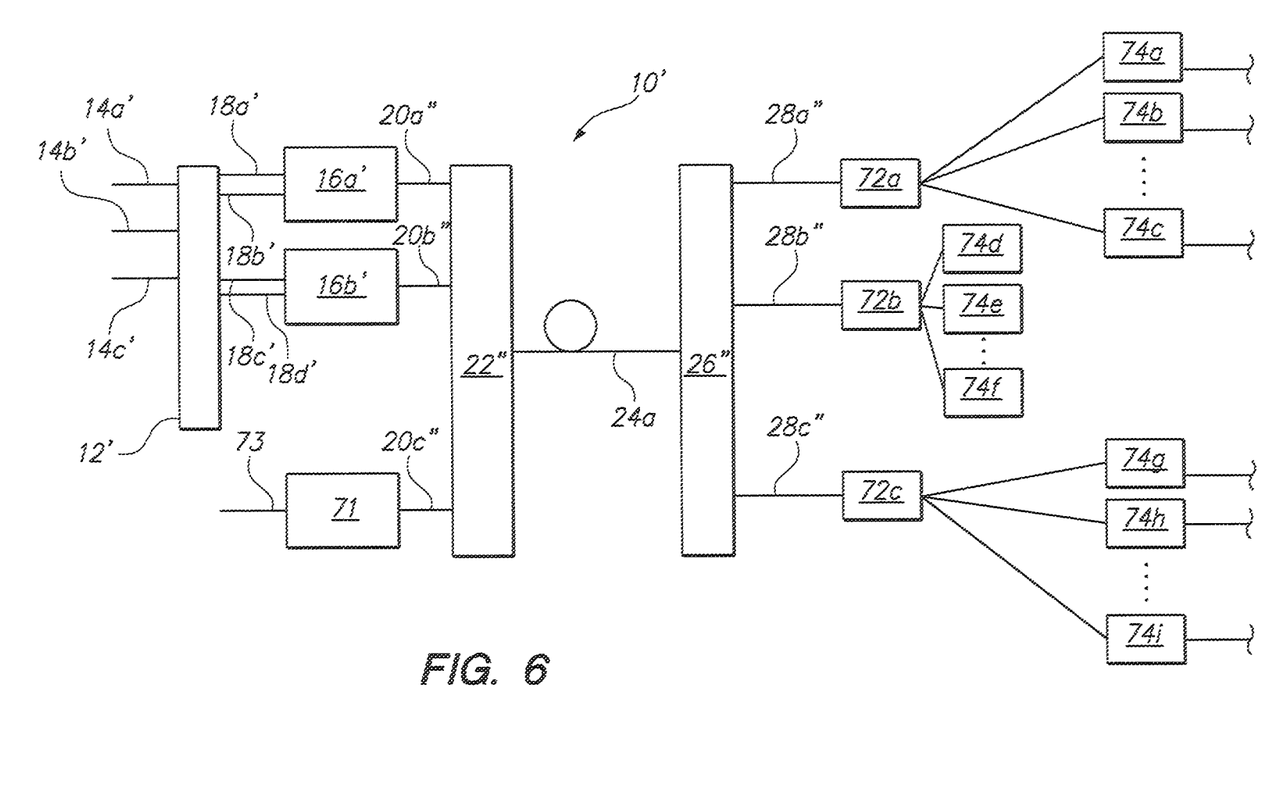
FIG. 6 is a schematic drawing showing a general overview of another embodiment of a transmission system in accordance with the present invention.

Referring now to FIG. 6, another, more generalized, embodiment of a system for transporting analog and/or digital signals is shown and is generally designated 10'. As shown, the system 10' includes a data switching and routing unit 12' operationally connected to receive a plurality of digital data streams (of which data streams 14a'-c' are labeled) and route the received data streams 14a'-c' based on address information in the data stream 14a'-c' to an appropriate modem 16a', b'. Although two modems 16a',b' are shown, it is to be appreciated that more than two and as few as one modem 16a' or 16b' may be employed in the system 10' For the system 10', the data streams 14a'-c' can include, for example, packets having a header with source and destination information, such as computer signals including computer files or instructions and/or digital signals from other nodes in a communication network.

Continuing with FIG. 6, as shown, each modem 16a',b' receives and operates on one or more respective routed data stream 18a'-d' and outputs a respective RF signal 20a",b" having a carrier that is modulated by one or more of the routed digital data streams 18a'-d'. Typically, each RF signal that is output by a modem 16a',b' has a frequency in the range of about 10 MHz to 1 GHz.

Continuing with reference to FIG. 6, it can be seen that an RF inserter 71 receives signals 73 such as video signals and outputs a corresponding RF signal 20c". For example, the signals 73 that are input to the RF inserter may be analog video signals, digital video signals or any type analog signal known in the pertinent art. Additionally, the signals 73 can include a monitoring signal and/or a telemetry signal. Further, for the system 10', the RF inserter 71 can perform a modulation function in generating the RF signal 20c" such as quadrature amplitude modulation (QAM) or quadrature phase shift keying (QPSK) or any other suitable modulation technique known in the pertinent art. For the system 10', the RF inserter 71 generates an RF signal 20c" that is compatible with the modem 16a',b' outputs (i.e. RF signals 20a",b") such that the RF signals 20a"-c" can be processed together in transmitter 22", as described below.

FIG. 6 shows that the RE signals 20a"-b" from the modems 16a',b' and the RF signal 20c" from RE inserter 71 are collectively processed and converted by a transmitter 22" (as described above with reference to transmitter 22 (see FIG. 2) or transmitter 22' (see FIG. 4)). Transmitter 22 then outputs an optical signal onto optical fiber 24a. A receiver 26" (as described above with reference to receiver 26 (FIG. 2) or receiver 26' (FIG. 4)) processes and converts the optical signal from the optical fiber 24a and outputs a plurality of RE signals 28a"-c". From the receiver 26", the RE signals 28a"-c" are received by a respective coaxial distribution unit 72a-c which directs each RF signal 28a"-c", based an its destination address to a modem 74a-i. Modems 74a-i can include one or more RF signal to digital signal modems recovering initial data signals 14a'-c' and/or one or more RE signal to analog signal modems recovering initial signal 73, which may be for example an analog video signal.

For the present invention, the system 10' shown can be provided with a capability for increasing the flow of data signals 14a'-c' through the optical fiber 24a. Specifically, for the system 10', one or more of the modems 16a',b' may be a so-called master modem and one or more of the modems 74a-i may be so-called slave modems. Thus, for the system 10', one, some or all of the modems 16a',b' may, be master modems. Accordingly, one, some or all of the modems 16a',b' may be standard (non-master) modems. Further, one, some or all of the modems 74a-i may be slave modems, and one, some or all of the modems 74a-i may be standard (non-slave) moderns.

For the arrangement shown, the slave modems 74a-i are controlled by a master modem 16a',b'. Typically, as shown, a master modem 16a',b' controls more than one slave modem 74a-i and routes data streams 14a'-14c' to a slave modem 74a-i under its control. For example, the system 10' can be configured such that master modem 16b' controls slave modems 74d-f. When a data signal, such as data signal 14c' having a destination address that is served by slave modem 74e reaches the data switching and routing unit 12', the data signal 14c' is routed to the master modern 16b' that controls the slave modem 74e. For example, the frequency or some other signal parameter of the signal 20b" exiting the master modern 16b' can be controlled such that the signal 20b" reaches the targeted slave modem 74e. In addition, each RF inserter can control one or more slave modems 74a-i.

Within the above-described framework, the volume of signal transmissions between an upstream device and a downstream device can be time controlled and/or frequency controlled. Moreover, as envisioned for the present invention, the system 10' can be used in either a point-to-point network or in a point-to-multipoint network. In more detail, one, some or all of the modems 16a',b' and/or RF inserters 71 can include a Time Division Multiplexing (TDM) capability. Specifically, the TDM capability is provided to establish a stacking protocol for data transmissions that will prevent a collision of signals which might otherwise cause an overload in the system 10'. In addition to the TDM capability, or as an alternative to TDM, one, some or all of the modems 16a',b' and/or RF inserters 71 can include a Frequency Division Multiplexing (FDM) capability. More specifically, this FDM capability is provided to accommodate the data transmission capability of the modems 16a',b' and/or RF inserters 71, and to enable signal transmissions to different downstream devices on different frequencies. In this combination, the FDM scheme establishes different signal frequencies for respective signals to maintain signal integrity. Also, different frequencies can be used in the FDM scheme for the purpose of routing signals to specifically intended destination addresses. Each modem 16a',b' and/or RF inserter 71 then uses its TDM capability to queue the data signals into a TDM protocol for subsequent transmission over the optical fiber 24a.

In accordance with the TDM protocol, each modem 16a',b' and/or RF inserter 71 establishes its own sequence for message transmissions. Further, as part of the TDM protocol, the moderns 16a',b' and/or RF inserters 71 will also impose specific time-of-transmission requirements for messages that are in its queue. The specific configuration of the TDM protocol and its time-of-transmission requirements in particular, will depend on the traffic capacity of the downstream components that are connected with the particular modems 16a',b' and/or RF inserters 71 such as a coaxial distribution unit 72a-c and/or one or more slave modems 74a-i. At the slave modern 74a-i, the frequency of each signal is adjusted to comply with any requirements imposed by the modems 16a',b' and/or RF inserters 71 in the FDM scheme, such as identification of a destination address. Each signal is then further transmitted from the slave modem 74a-i to the particular downstream device at the destination address.

In operation of the system 10', a data stream 14a'-c' is routed from an upstream device at the data switching and routing unit 12' to a particular modems 16a',b'. Specifically, the particular modem 16a',b' that is to be used will be selected according to the destination address of the data stream 14a'-c'. Recall, each master modem 16a',b' is connected with specific downstream components such as a coaxial distribution unit 72a-c and one or more slave modems 74a-i.

Upon the receipt of a data stream 14a'-c' or signal 73, a master modern 16a',b' or RF inserter 71 assigns frequencies according to an TDM scheme and establishes a TDM protocol. In particular, the FDM scheme is employed to avoid data congestion from incoming signals at the modems 16a',b' and/or RE inserters 71, and to direct signals to the intended destination address. Further, the TDM protocol is configured to accommodate the present traffic volume demands on the system 10'. As indicated above, the TDM protocol accommodates the coaxial distribution unit 72a-c, and slave modem 74a-i that serve the downstream device at the destination address. For the system 10', the configuration of the TDM protocol will include imposing specific time-of-transmission requirements for the data stream 14a'-c' and/or signal 73. Once a TDM protocol has been configured, the data stream 14a'-c' and/or signal 73 is then sent over the optical fiber 24a in compliance with the TDM protocol. More specifically, the RE signals 20a"-c" output from the moderns 16a',b' and/or RF inserters 71 can be up-converted and combined to generate a combined sub-octave signal (as described above) in the transmitter 22". Also in the transmitter 22", the combined sub-octave signal is directed to an optical transmitter which converts the combined sub-octave signal into an optical signal and directs the optical signal onto an end of optical fiber 24a.

At the downstream end of the optical fiber 24a, the received optical signal is converted to an RF signal at the receiver 26". At the receiver 26", the received RF signal is then split, filtered and down-converted (as described above) and then routed to a selected coaxial distribution unit 72a-c. As indicated above, the selection of the particular coaxial distribution unit 72a-c that will receive the data is determined based on the destination address of the data stream 14a'-c' and/or signal 73. The coaxial distribution unit 72a-c then routes the data stream 14a'-c' and/or signal 73 to the appropriate modem 74a-i for further transmission to the downstream device at the destination address.

Upstream transmissions from the downstream device to an upstream device will use essentially the same routing that is described above for downstream transmissions. This is so regardless whether the upstream transmission is a reply or is a new message. In either case, however, before there can be an upstream transmission, a slave modem 74a-i must first receive permission from the master modem 16a',b' to make the transmission. This requires the slave modem 74a-i to send a request signal to the master modem 16a',b' for instructions regarding compliance with an FDM scheme, and for a position in its TDM protocol. When the TDM protocol has been configured according to time availability and the transmission delay to accommodate the upstream transmission, and compliance with the FDM scheme has been established, the slave modem 74a-i is notified by the master modem 16a'-c' that an upstream transmission can be sent. The downstream device can then transmit upstream to the upstream device.

While the particular Switching and Routing Protocol for a Fiber Optic Transmission System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for transporting a plurality of digital data signals, the system comprising:
    at least one RF inserter receiving a video signal and outputting an RF signal;
    at least one master modem outputting a signal modulated with at least one digital signal;
    an up-convertor system operating on RF signals downstream of an RF inserter and a master modem to output an RF signal having a frequency bandwidth within a single sub-octave;
    an optical transmitter converting a single sub-octave RF signal downstream of the up-convertor system into an optical signal and directing the optical signal into an optical fiber;
    an optical receiver downstream of the optical fiber converting the optical signal to an RF signal;
    a down-convertor system receiving an RF signal downstream of the optical receiver and outputting an RF signal having the video signal encoded thereon; and
    a slave modem receiving an RF signal having at least one digital signal encoded thereon downstream of the down-convertor system and outputting at least one digital signal, the slave modem configured to delay transmission of an upstream signal to the optical receiver until a transmit notification has been received from a master modem.

2. A system as recited in claim 1 wherein a master modem receives a plurality of input digital signals and outputs a frequency-division-multiplexed (FDM) signal encoding at least two input digital signals.

3. A system as recited in claim 1 wherein a master modem receives a plurality of input digital signals and outputs a time-division-multiplexed (TDM) signal encoding at least two input digital signals.

4. A system as recited in claim 1 wherein a master modem establishes a TDM protocol configured to accommodate the present traffic volume demands on the slave modem.

5. A system as recited in claim 1 wherein a master modem receives a plurality of input digital signals and outputs a frequency-division-multiplexed (FDM) signal encoding at least two input digital signals that is also time-division-multiplexed (TDM).

6. A system as recited in claim 1 further comprising a coaxial distribution unit receiving an RF signal having at least one digital signal encoded thereon downstream of the down-convertor system and wherein the slave modem receives an RF signal having at least one digital signal encoded thereon downstream of the coaxial distribution unit.

7. A system as recited in claim 1 further comprising a coaxial distribution unit receiving an RF signal having at least one digital signal encoded thereon downstream of the down-convertor system and wherein a master modem receives a plurality of input digital signals and outputs a time-division-multiplexed (TDM) signal establishing a TDM protocol configured to accommodate the present traffic volume demands on the co-axial distribution unit.

8. A system as recited in claim 1 wherein the up-converter system comprises a plurality of up-convertors and an RF combiner, each up-convertor outputting a respective frequency band; the frequency bands being non-overlapping with each other and spaced apart from each other within a single sub-octave, and wherein the RF combiner produces a combined RF signal from the frequency bands.

9. A system as recited in claim 1 wherein the down-converter system comprises a plurality of down-convertors and an RF splitter producing signal fractions from the transmitted RF signal; and wherein each down-convertor receives a signal fraction downstream from the splitter and outputs an RF signal having the video signal encoded thereon.

10. A system as recited in claim 1 wherein the RF inserter modulates the video signal on a carrier signal using quadrature amplitude modulation (QAM).

11. A system as recited in claim 1 wherein the video signal is selected from the group of video signals including an analog video signal and a digital video signal.

12. A system as recited in claim 1 wherein a monitoring signal is received by the RF inserter with the video signal.

13. A system as recited in claim 1 wherein a telemetry signal is received by the RF inserter with the video signal.

14. A device for transmitting a plurality of digital data signals into an optical fiber, the device comprising:
    at least one master modem receiving a plurality of digital signal inputs and outputting a multiplexed RF signal encoding at least two input digital signals, wherein a master modem is configured to communicate a transmit signal to a downstream slave modem to initiate a transmission of an upstream signal by the slave modem;
    an up-convertor system operating on at least one RF signal downstream of a master modem to output an RF signal having a frequency bandwidth within a single sub-octave; and
    an optical transmitter converting a single sub-octave RF signal downstream of the up-convertor system into an optical signal for input into an optical fiber.

15. A device as recited in claim 14 wherein the multiplexed signal encoding at least two input digital signals is selected from the group of signals comprising a frequency-division-multiplexed (FDM) signal, a time-division-multiplexed (TDM) signal and a signal that is frequency-division-multiplexed (FDM) and time-division-multiplexed (TDM).

16. A device as recited in claim 14 wherein the up-converter system comprises a plurality of up-convertors and an RF combiner, each up-convertor outputting a respective frequency band; the frequency bands being non-overlapping with each other and spaced apart from each other within a single sub-octave, and wherein the RF combiner produces a combined RF signal from the frequency bands.

17. A device as recited in claim 14 further comprising at least one RF inserter receiving a video signal and outputting an RF signal and wherein the up-convertor system operates on at least one RF signal downstream of an RF inserter to output an RF signal having a frequency bandwidth within a single sub-octave.

18. A method for transporting a plurality of digital data signals, the method comprising the steps of:
- outputting an RF signal modulated with at least one digital signal from at least one master modem;
- up-converting at least one RF signal downstream of a master modem to output an RF signal having a frequency bandwidth within a single sub-octave;
- converting a single sub-octave RF signal into an optical signal and directing the optical signal into an optical fiber;
- converting an optical signal to an RF signal downstream of the optical fiber;
- down-converting an RE signal and outputting an RF signal having at least one digital signal encoded thereon;
- receiving an RF signal having at least one digital signal encoded thereon at a slave modem;
- outputting at least one digital signal from the slave modem;
- delaying transmission of an upstream signal by the slave modem; and
- transmitting the upstream signal upon receipt of a transmit notification from a master modem.

19. A method as recited in claim 18 wherein a master modem receives a plurality of input digital signals and outputs a frequency-division-multiplexed (FDM) signal encoding at least two input digital signals.

20. A method as recited in claim 18 wherein a master modem receives a plurality of input digital signals and outputs a time-division-multiplexed (TDM) signal encoding at least two input digital signals.

21. A method as recited in claim 18 further comprising the step of receiving an RF signal having at least one digital signal encoded thereon at a coaxial distribution unit and wherein the slave modem receives an RF signal having at least one digital signal encoded thereon downstream of the coaxial distribution unit.

* * * * *

UNITED STATES PATENT AND TRADEMARK OFFICE
CERTIFICATE OF CORRECTION

PATENT NO. : 8,909,046 B2
APPLICATION NO. : 13/645292
DATED : December 9, 2014
INVENTOR(S) : Chen-Kuo Sun and Peter H. Wolff It is certified that error appears in the above-identified patent and that said Letters Patent is hereby corrected as shown below:

In the Specification

Column 4, Line 38 - DELETE ""master modern(s)."" and INSERT -- "master modem(s)." --;

Column 5, Line 16 - DELETE "FEW" and INSERT -- FDM --;

Column 5, Line 18 - DELETE "FM" and INSERT -- FDM --;

Column 7, Line 44 - DELETE "RE signal" and INSERT -- RF signal --;

Column 7, Line 51 - DELETE "RE signals" and INSERT -- RF signals --;

Column 7, Line 54 - DELETE "RE signals" and INSERT -- RF signals --;

Column 10, Line 65 - DELETE "RE signals" and INSERT -- RF signals --;

Column 10, Line 66 - DELETE "RE inserter" and INSERT -- RF inserter --;

Column 11, Line 18 - DELETE "moderns" and INSERT -- modems --;

Column 11, Line 19 - DELETE "one or more of the moderns" and INSERT -- one or more of the modems --;

Column 11, Line 22 - DELETE "all of the moderns" and INSERT -- all of the modems --;

Column 11, Line 23 - DELETE "moderns" and INSERT -- modems --;

Column 11, Line 24 - DELETE "slave moderns" and INSERT -- slave modems --;

Signed and Sealed this
First Day of December, 2015

Michelle K. Lee
*Director of the United States Patent and Trademark Office*

CERTIFICATE OF CORRECTION (continued)
U.S. Pat. No. 8,909,046 B2

In the Specification (continued)

Column 11, Line 26 - DELETE "moderns." and INSERT -- modems. --;

Column 11, Line 36 - DELETE "modern" and INSERT -- modem --;

Column 11, Line 39 - DELETE "modern" and INSERT -- modem --;

Column 12, Line 4 - DELETE "moderns" and INSERT -- modems --;

Column 12, Line 27 - DELETE "modern" and INSERT -- modem --;

Column 12, Line 28 - DELETE "an TDM scheme" and INSERT -- an FDM scheme --;

Column 12, Line 43 - DELETE "RE signals 20a"-c" output from the moderns" and INSERT -- RF signals 20a"-c" output from the modems --;

Column 13, Line 9 - DELETE "modern 74a-i" and INSERT -- modem 74a-i --.